United States Patent
Hirata et al.

(10) Patent No.: US 8,467,276 B2
(45) Date of Patent: Jun. 18, 2013

(54) THERMALLY-ASSISTED MAGNETIC RECORDING HEAD HAVING PHOTOELECTRIC WIRING LINES INTEGRALLY FORMED ON WAVEGUIDE

(75) Inventors: Masakazu Hirata, Chiba (JP); Manabu Oumi, Chiba (JP); Mizuaki Suzuki, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 121 days.

(21) Appl. No.: 12/736,993

(22) PCT Filed: May 19, 2009

(86) PCT No.: PCT/JP2009/059198
§ 371 (c)(1),
(2), (4) Date: Apr. 18, 2011

(87) PCT Pub. No.: WO2009/147943
PCT Pub. Date: Dec. 10, 2009

(65) Prior Publication Data
US 2011/0188355 A1   Aug. 4, 2011

(30) Foreign Application Priority Data
Jun. 2, 2008  (JP) .................. 2008-144981

(51) Int. Cl.
*G11B 11/00* (2006.01)

(52) U.S. Cl.
USPC .................... 369/13.33; 369/13.13

(58) Field of Classification Search
USPC .......... 369/13.13, 13.02, 13.33, 13.32, 13.17, 369/112.09, 112.14, 112.21, 112.27, 200; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 2008/0055762 A1* | 3/2008 | Shimazawa et al. | 369/13.33 |
| 2008/0115962 A1* | 5/2008 | Juni et al. | 174/250 |
| 2008/0158709 A1* | 7/2008 | Tanaka et al. | 369/13.33 |
| 2008/0205202 A1* | 8/2008 | Komura et al. | 369/13.33 |
| 2010/0085664 A1* | 4/2010 | Hirata et al. | 360/245.4 |
| 2011/0075527 A1* | 3/2011 | Hirata et al. | 369/13.33 |
| 2011/0122738 A1* | 5/2011 | Hirata et al. | 369/13.32 |
| 2011/0194809 A1* | 8/2011 | Nishio et al. | 385/14 |
| 2011/0199868 A1* | 8/2011 | Hirata et al. | 369/13.33 |
| 2012/0113769 A1* | 5/2012 | Hirata et al. | 369/13.32 |
| 2012/0230170 A1* | 9/2012 | Hirata et al. | 369/13.33 |

FOREIGN PATENT DOCUMENTS

JP   2007335027   12/2007

* cited by examiner

*Primary Examiner* — Tan X Dinh
(74) *Attorney, Agent, or Firm* — Adams & Wilks (57) ABSTRACT

An information recording and reproduction apparatus has a magnetic recording medium, a light source that outputs a light beam to heat the medium, and a near-field light head confronting a surface of the medium. An optical waveguide introduces a light beam from the light source into the near-field light head to generate near-field light. A control section supplies a current to a recording element of the near-field light head for generating a recording magnetic field in a direction of the medium. A photoelectric composite wiring line has the optical waveguide and at least one electric wiring line integral with the optical waveguide and electrically connecting the near-field light head to the control section. The optical waveguide and the electric wiring line branch off from a distal side of the photoelectric composite wiring line so as to connect to the near-field light head.

21 Claims, 8 Drawing Sheets

THERMALLY-ASSISTED MAGNETIC RECORDING HEAD HAVING PHOTOELECTRIC WIRING LINES INTEGRALLY FORMED ON WAVEGUIDE

CROSS-REFERENCE TO RELATED APPLICATIONS

This application is a U.S. national stage application of International Application No. PCT/JP2009/059198 filed May 19, 2009, claiming a priority date of Jun. 2, 2008, and published in a non-English language.

BACKGROUND OF THE INVENTION

TECHNICAL FIELD

The present invention relates to an information recording and reproduction apparatus which records and reproduces various kinds of information on and from a magnetic recording medium using spot light obtained by a condensing light beam.

BACKGROUND ART

In recent years, the recording density of the information within a single recording surface has been increasing with increases in the capacity of a hard disk or the like in a computer apparatus. For example, in order to increase the recording capacity per unit area of a magnetic disk, it is necessary to increase the surface recording density. However, as the recording density increases, the recording area per bit occupied on a recording medium decreases. If the bit size is reduced, the energy of the 1-bit information becomes close to heat energy at room temperature. As a result, a problem of thermal demagnetization occurs. For example, the recorded information is reversed or lost due to thermal fluctuation or the like.

An in-plane recording method generally used is a method of performing magnetic recording such that the direction of magnetization faces an in-plane direction of a recording medium. In this method, however, loss of the recording information by thermal demagnetization described above and the like easily occur. Therefore, in order to solve such a problem, there is a shift to a perpendicular recording method which records a magnetization signal in a vertical direction with respect to a recording medium. This method is a method of recording the magnetic information on a recording medium under the principle of bringing single poles close to each other. According to this method, the recording magnetic field faces an almost vertical direction with respect to a recording layer. Since it is difficult for an N pole and an S pole to make a loop within a recording layer surface, the information recorded in a vertical magnetic field tends to maintain the stability in terms of energy. For this reason, this perpendicular recording method is stronger against the thermal demagnetization as compared to the in-plane recording method.

However, in recent years there has been a demand for recording media to have a higher density according to the need for the recording and reproduction of a larger amount of information with higher density. Accordingly, in order to suppress to a minimum an influence between adjacent magnetic domains or thermal fluctuation, recording media with strong coercivity have started to be adopted. For this reason, even in the perpendicular recording method described above, it has been difficult to record the information on a recording medium.

Therefore, in order to solve this problem, there is provided a hybrid magnetic recording method of temporarily reducing the coercivity by locally heating a magnetic domain using spot light, which is obtained by condensing light beam, or near-field light, which is obtained by condensing light beam, and performing writing in the meantime. In particular, when using near-field light, it becomes possible to treat the optical information in a region with a wavelength of light or less, which was not possible in a conventional optical system. Consequently, it is possible to realize high density of recording bits exceeding conventional optical information recording and reproduction apparatus and the like.

Various items are provided as information recording and reproduction apparatuses based on the hybrid magnetic recording method described above. As one of them, there is known an information recording and reproduction apparatus capable of realizing reproduction and recording with super-high resolution, high-speed recording and reproduction, and a high S/N ratio by generating sufficiently large near-field light from a fine aperture by supplying light for generating near-field light to a near-field light head.

As this information recording and reproduction apparatus, there is known a configuration which includes a driving arm (carriage), which can angle-oscillate around a pivot bearing shaft by a voice coil motor (VCM) or the like, and in which a slider provided with a near-field light head is fixed to a distal end of the driving arm. This slider includes a unit substrate bonded to an opposite surface to an ABS-side surface (floating surface) of the slider, that is, an upper surface of the slider, a light source provided on the unit substrate, a propagation layer which is provided on an element forming surface of the unit substrate and which includes an optical path of light emitted from the light source, and a lens section which is provided in the propagation layer in order to adjust propagation of the light emitted from the light source, as disclosed in Patent Document 1, for example.

The information recording and reproduction apparatus described above disposes the slider at the desired position on a disk by making the slider perform scanning on the disk by moving the driving arm around the pivot bearing shaft. Then, the near-field light emitted from the light source and the recording magnetic field generated from the slider are made to cooperate with each other so that the information can be recorded on the disk. In addition, the ABS of the slider is configured to float such that when air pressure is applied to the slider by the undulation of a disk or the like, it follows the air pressure.

RELATED ART DOCUMENT

Citation List
Patent Document 1: Japanese Unexamined Patent Publication No. 2007-335027

In the conventional information recording and reproduction apparatus described above, however, the light source is mounted on the unit substrate bonded to the upper surface of the slider. Accordingly, since the heat generated from the light source is directly transferred to the slider, the slider is heated. If the slider is heated, the slider may warp or thermal expansion may occur. The ABS of the slider described above is configured such that the slider floats according to air pressure when the air pressure is applied to the slider by the undulation of a disk or the like. If this ABS deforms by warpage or thermal expansion of the slider, there is a problem that the floating characteristic of the slider changes. In addition, if the slider is heated, the characteristic and the like of a reproduction element of the slider are affected. Accordingly, recording and reproduction of the information may not be controlled very accurately and correctly.

In order to solve this, it may also be considered to dispose a light source at a position distant from the slider. In this case, however, the layout efficiency of an optical waveguide for guiding light beam emitted from the light source toward the slider becomes a problem.

Specifically, when an optical waveguide and an electric wiring line are routed to the slider, it is necessary to fix the optical waveguide and the electric wiring line separately. Accordingly, the manufacturing efficiency is noticeably reduced.

Moreover, if the optical waveguide is routed from the light source to the slider while being bent when guiding light beam emitted from the light source to the slider, guiding loss of light beam passing through the optical waveguide becomes large. Accordingly, there is a problem in that the light propagation efficiency is reduced.

Therefore, the present invention has been made in view of the foregoing problems, and it is an object of the present invention to provide an information recording and reproduction apparatus capable of suppressing an influence of heat generated from a light source and of improving the light propagation efficiency in order to prevent a lowering in manufacturing efficiency.

SUMMARY OF THE INVENTION

The present invention provides the following techniques in order to solve the foregoing problems.

An information recording and reproduction apparatus related to the present invention includes: a magnetic recording medium which rotates in a fixed direction; a light source which emits light beam in order to heat the magnetic recording medium; a pivot shaft disposed at the outside of the magnetic recording medium; a carriage formed so as to be rotatable around the pivot shaft; a slider which is supported at a distal side of the carriage so as to face a surface of the magnetic recording medium; and a control unit that controls an operation of the slider. The slider has an optical system which condenses light beam emitted from the light source and a spot light generating element which generates spot light from the condensed light beam. The information recording and reproduction apparatus records the information on the magnetic recording medium by heating the magnetic recording medium with the spot light and causing magnetization reversal by applying a recording magnetic field to the magnetic recording medium and is characterized in that a photoelectric composite wiring line is provided in which an optical waveguide, which introduces light beam emitted from the light source into the slider, and a plurality of electric wiring lines, which electrically connects the slider and the control unit to each other, are integrally formed and the optical waveguide and the electric wiring lines branch off at the distal side of the photoelectric composite wiring line to be routed to the slider.

In the information recording and reproduction apparatus related to the present invention, the information can be recorded on a magnetic recording medium, such as a rotating optical disk, by a hybrid magnetic recording method of making spot light and a recording magnetic field cooperate with each other. First, the slider supported at the tip of the suspension is moved in a direction parallel to the surface of the magnetic recording medium in order to scan the magnetic recording medium. Accordingly, the slider can be located at the desired position on the magnetic recording medium. Subsequently, light beam emitted from the light source are guided to the slider. Then, the light beam guided to the slider are condensed by the optical system. Then, the spot light generating element can generate spot light from the condensed light beam. In addition, the spot light generating element is formed by an optically fine aperture, a protruding portion formed in a nanometer size, and the like.

In addition, the magnetic recording medium is locally heated by the spot light and accordingly, the coercivity is temporarily reduced. As a result, various kinds of information can be recorded and reproduced on and from the recording medium using the slider.

In particular, according to the information recording and reproduction apparatus of the present invention, since the optical waveguide and the electric wiring lines are integrally formed as the photoelectric composite wiring line, the optical waveguide and the electric wiring lines can be simultaneously fixed. Accordingly, a lowering in manufacturing efficiency can be prevented. Therefore, even when the light source is disposed at a position distant from the slider, the photoelectric composite wiring line can be easily routed to the slider. As a result, the influence of heat generated from the light source can be suppressed.

In addition, by branching off the photoelectric composite wiring line again at the distal side, the optical waveguide and the electric wiring line can be routed to the slider along different paths. As a result, the routing path to the slider is not restricted. That is, since the degree of freedom in the routing of the optical waveguide and the electric wiring line can be improved compared with the configuration in which the optical waveguide and the electric wiring line are routed to the slider in a state where they are integrally formed, a routing path which is optimal for each wiring line can be selected. In this case, in particular, the optical waveguide can be routed to the slider without bending as much as possible. Accordingly, since the guiding loss of light beam passing through the optical waveguide can be reduced, the light propagation efficiency can be maintained.

In addition, since the force acting on the slider from the optical waveguide and the electric wiring lines does not concentrate by routing the optical waveguide and the electric wiring lines to the slider so as to be branched, obstruction of them in posture control of the slider can be prevented. Accordingly, there is little influence on the floating characteristic of the slider, tracking accuracy, and the like.

Moreover, the information recording and reproduction apparatus related to the present invention is characterized in that the radius of curvature of the optical waveguide from the distal side of the photoelectric composite wiring line to the slider is larger than the radius of curvature of the electric wiring line.

In the information recording and reproduction apparatus related to the present invention, the optical waveguide can be routed to the slider without bending as much as possible by setting the radius of curvature of the optical waveguide to be larger than the radius of curvature of the electric wiring line. As a result, since the guiding loss of light beam passing through the optical waveguide can be reduced, the light propagation efficiency can be maintained.

Moreover, the information recording and reproduction apparatus related to the present invention is characterized in that a gimbal means for supporting the slider in a state rotatable around two axes, which are parallel to the surface of the magnetic recording medium and are perpendicular to each other, is provided in the carriage, a tongue piece portion, which is formed to overhang from the distal side of the carriage toward the base end side and which has a notched portion in the periphery, is provided in the gimbal means, the slider is provided on the tongue piece portion, the slider includes a recording element and a reproduction element at the distal side of the carriage, the electric wiring lines are routed from the distal side to the slider along the surface of the carriage, and the optical waveguide is routed from the base end side of the carriage to the slider across the notched portion.

In the information recording and reproduction apparatus related to the present invention, since the tongue piece portion is formed to overhang from the distal side of the carriage toward the base end side, bending of the optical waveguide becomes large if the optical waveguide is routed from the distal side to the slider along the surface of the carriage. On the other hand, in the present invention, since the optical waveguide is routed from the base end side to the slider across the notched portion, the optical waveguide can be routed to the slider without bending as much as possible. On the other hand, since there is no problem even if electric wiring lines are bent, the electric wiring lines can be directly connected to a recording element and a reproduction element of the slider by routing the electric wiring lines from the distal side to the slider along the surface of the carriage.

ADVANTAGEOUS EFFECTS OF INVENTION

According to the information recording and reproduction apparatus related to the present invention, in order to prevent a lowering in manufacturing efficiency, a light source can be disposed to be spaced apart from a slider. As a result, an influence of heat generated from the light source can be suppressed and the light propagation efficiency can be improved.

Figure 1:
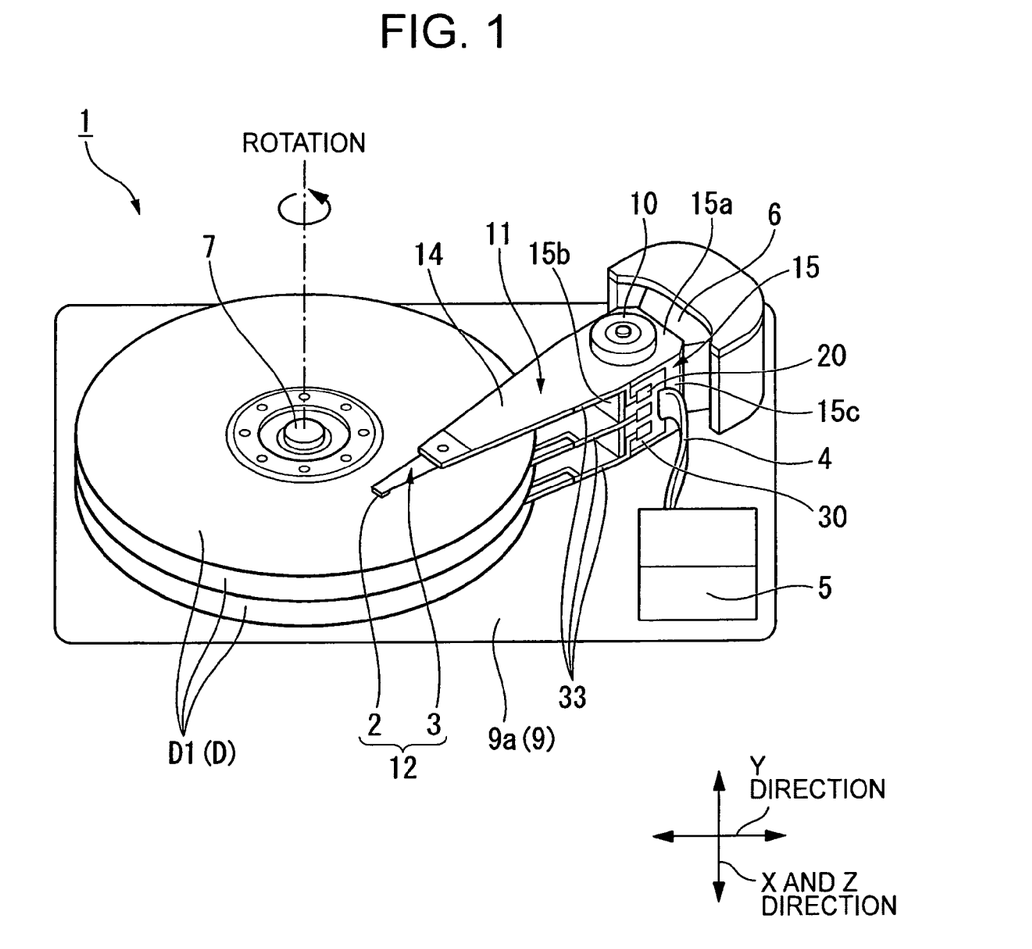
FIG. 1 is a view showing the configuration of an embodiment of an information recording and reproduction apparatus related to the present invention.

DETAILED DESCRIPTION OF THE INVENTION (First embodiment)
(Information recording and reproduction apparatus)
Hereinafter, a first embodiment related to the present invention will be described with reference to FIGS. 1 to 7. FIG. 1 is a view showing the configuration of a first embodiment of an information recording and reproduction apparatus 1 related to the present invention. In addition, the information recording and reproduction apparatus 1 of the present embodiment is an apparatus which performs writing on a disk (magnetic recording medium) D, which has a perpendicular recording layer, by a perpendicular recording method.

As shown in FIG. 1, the information recording and reproduction apparatus 1 of the present embodiment includes: a carriage 11; a laser light source 20 which supplies light beam from the base end side of the carriage 11 through a photoelectric composite wiring line 33; a head gimbal assembly (HGA) 12 supported on the distal side of the carriage 11; an actuator 6 which makes the head gimbal assembly 12 perform scan movement in the XY direction parallel to a disk surface D1 (surface of a disk D); a spindle motor 7 which rotates the disk D in a predetermined direction; a control unit 5 which supplies a current, which is modulated according to the information, to a slider 2 of the head gimbal assembly 12; and a housing 9 in which these respective constituent components are housed.

The housing 9 is formed of a metal material, such as aluminum, has a box shape with an upper opening, and is configured to include a bottom portion 9a with a rectangular shape when viewed from above and a peripheral wall (not shown) provided in a direction perpendicular to the bottom portion 9a in the peripheral edge of the bottom portion 9a. In addition, a recess in which each of the constituent components described above is housed is formed at the inside surrounded by the peripheral wall. Moreover, in FIG. 1, the peripheral wall which surrounds the periphery of the housing 9 is omitted for easy understanding of the explanation.

In addition, a lid (not shown) is detachably fixed to the housing 9 so as to cover the opening of the housing 9. The spindle motor 7 is fixed to the approximately middle of the bottom portion 9a, and the disk D is detachably fixed by inserting a center hole into the spindle motor 7.

The actuator 6 is fixed at the outer side of the disk D, that is, in the corner of the bottom portion 9a. The carriage 11 which is rotatable in the XY direction around a pivot shaft 10 is fixed to the actuator 6.

The carriage 11 is obtained by integrally forming an arm portion 14, which is provided to extend from the base end toward the distal end along the disk surface D1, and a base portion 15, which supports the arm portion 14 through the base end like a cantilever, by cutting processing or the like.

The base portion 15 is formed in a rectangular parallelepiped shape and is supported so as to be able to rotate around the pivot shaft 10. That is, the base portion 15 is connected to the actuator 6 through the pivot shaft 10, and the pivot shaft 10 is the center of rotation of the carriage 11.

The arm portion 14 has a plate shape extending in parallel to the surface direction (XY direction) of the upper surface of the base portion 15 on a side surface (side surface opposite a corner) 15b of the base portion 15 opposite a side surface 15a to which the actuator 6 is fixed, and three arm portions 14 extend along the height direction (Z direction) of the base portion 15. Specifically, the arm portion 14 is formed in a tapered shape which tapers from the base end toward the distal end, and is disposed so that the disk D is inserted between the respective arm portions 14. That is, the arm portion 14 and the disk D are alternately disposed, and the arm portion 14 is made to be movable in a direction (XY direction) parallel to the surface of the disk D by driving of the actuator 6. In addition, the carriage 11 and the head gimbal assembly 12 move back from over the disk D by driving of the actuator 6 at the stop of rotation of the disk D.

The head gimbal assembly 12 generates near-field light (spot light) by guiding light beam from the laser light source 20 to the slider 2, which is a near-field light head having a near-field light generating element (spot light generating element; not shown), and records and reproduces various kinds of information on and from the disk D using the near-field light. In addition, the near-field light generating element is formed by an optically fine aperture, a protruding portion formed in a nanometer size, and the like, for example.

Figure 2:
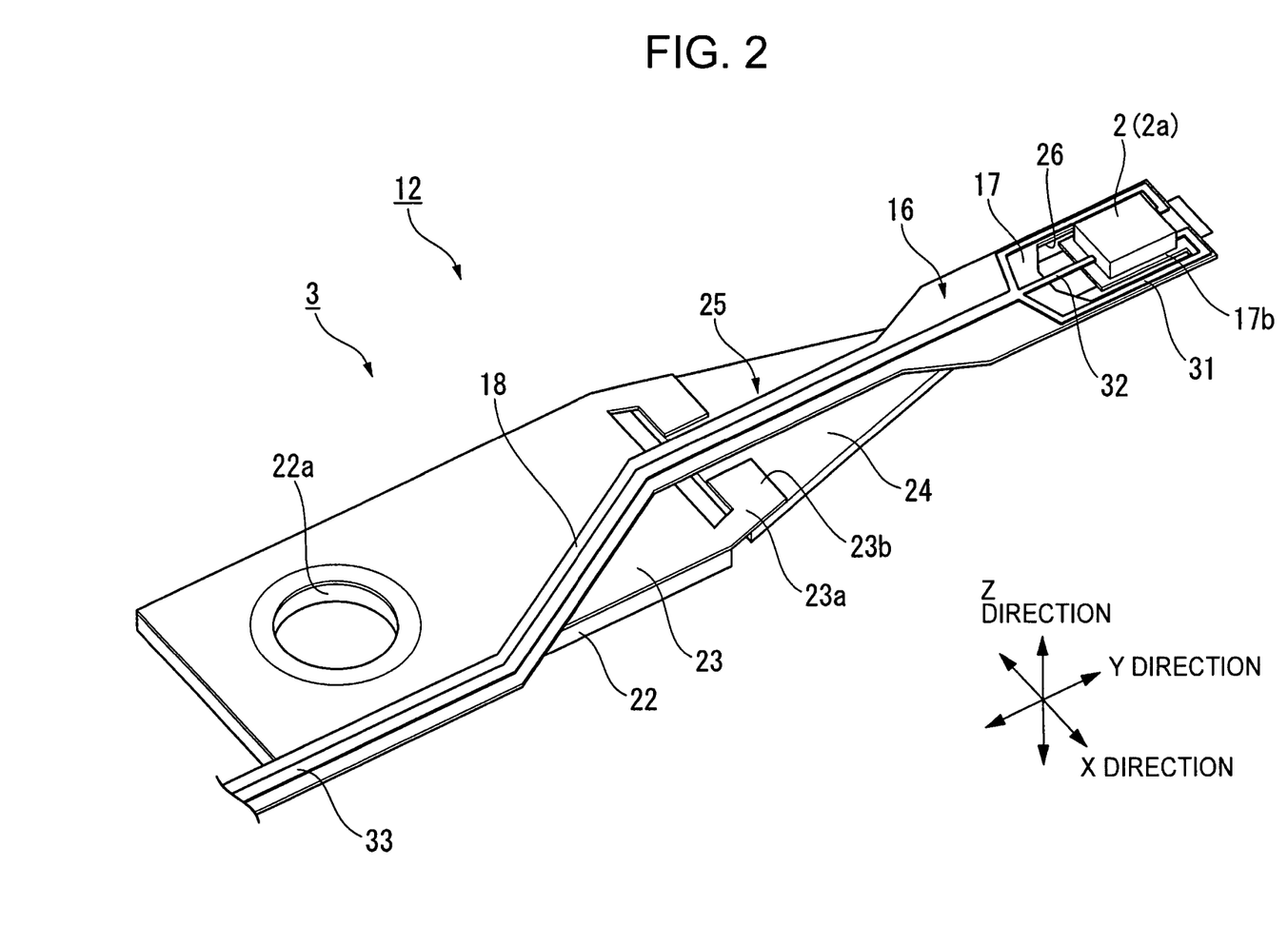
FIG. 2 is a perspective view of a head gimbal assembly shown in FIG. 1.
Figure 3:
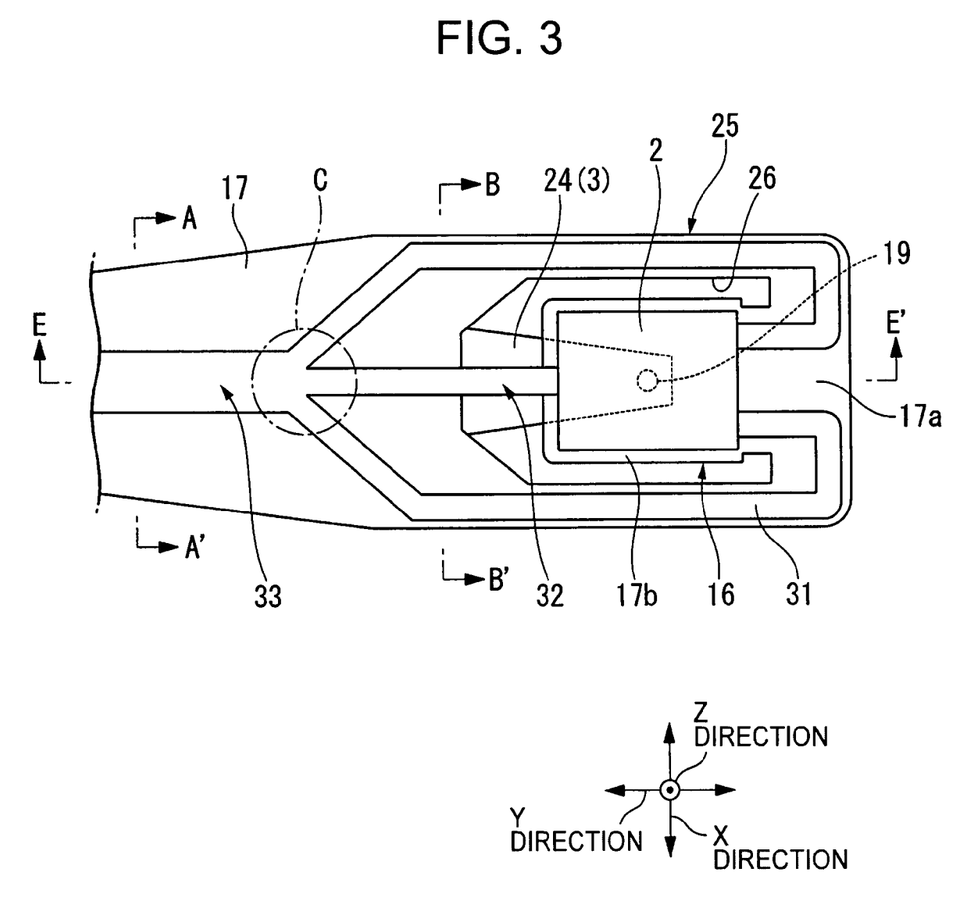
FIG. 3 is a plan view of a gimbal shown in FIG. 2.
Figure 4:
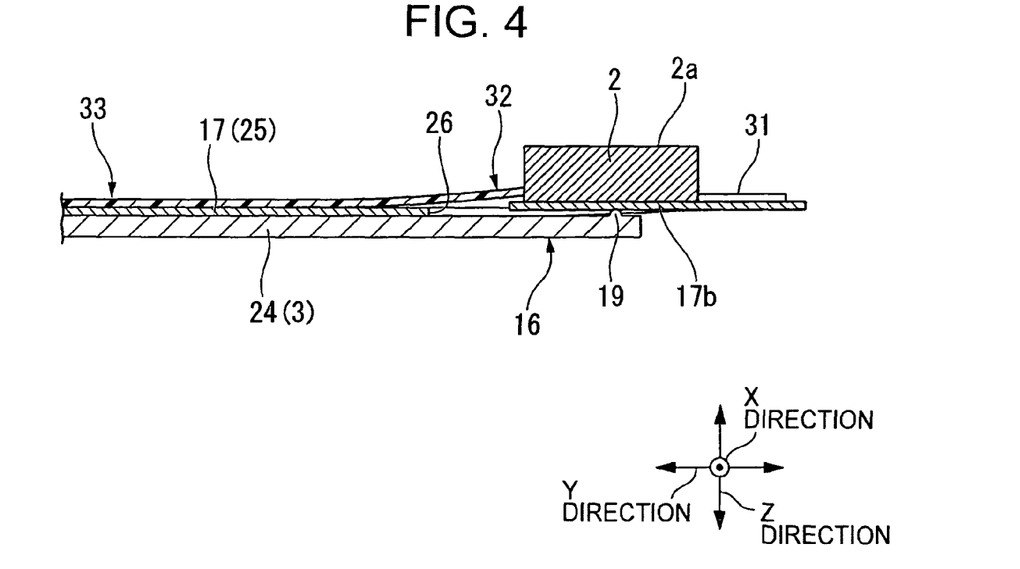
FIG. 4 is a cross-sectional view taken along the line E-E' of FIG. 3.

FIG. 2 is a perspective view when a suspension 3 is viewed from the slider 2 side in a state where the slider 2 is in the upward direction. FIG. 3 is a plan view when a gimbal 17 is viewed in a state where the slider 2 is in the upward direction. FIG. 4 is a cross-sectional view taken along the line E-E' of FIG. 3, and is a sectional view of the tip of the suspension 3 in a state where the slider 2 is in the upward direction.

As shown in FIGS. 2 to 4, the head gimbal assembly 12 of the present embodiment functions as a suspension, which makes the slider 2 float from the disk D, and includes the slider 2, the suspension 3 which is formed in a thin plate shape by a metal material and is movable in the XY direction parallel to the disk surface D1, and a gimbal means (supporting means) 16 for fixing the slider 2 to the bottom surface of the suspension 3 in a state rotatable around two axes (X and Y axes) which are parallel to the disk surface D1 and are perpendicular to each other, that is, so as to be able to be twisted around the two axes.

First, the slider 2 is supported on the bottom surface of the suspension 3 with the gimbal 17, which will be described later, interposed therebetween in a state disposed between the disk D and the suspension 3. The slider 2 includes a reproduction element (not shown), which is fixed to the distal side, and a recording element (not shown), which is fixed adjacent to the reproduction element. In addition, the slider 2 has a condensing lens (optical system; not shown), which is provided at the opposite side of the reproduction element with the recording element interposed and which condenses light beam emitted from the laser light source 20, and the near-field light generating element which generates near-field light from the light beam condensed by the condensing lens. That is, in the slider 2, a reproduction element, a recording element, and a near-field light generating element are located in a line at the distal end.

In addition, the bottom surface of the slider 2 is a floating surface 2a facing the disk surface D1. The floating surface 2a is a surface which generates pressure for floating by the viscosity of airflow generated by the rotating disk D, and is called an ABS (Air Bearing Surface). Specifically, it is designed such that the slider 2 floats in the optimal state by adjusting positive pressure, which separates the slider 2 from the disk surface D1, and negative pressure, which pulls the slider 2 to the disk surface D1.

The slider 2 receives a force floating from the disk surface D1 by the floating surface 2a and also receives a force pressed toward the disk D by the suspension 3. In addition, the slider 2 floats from the disk surface D1 by the balance of both the forces.

The suspension 3 is formed by a base plate 22, which is formed in an approximately rectangular shape when viewed from above, and a load beam 24, which is connected to the distal side of the base plate 22 through a hinge plate 23 and has an approximately triangular shape when viewed from above.

The base plate 22 is formed of a metal material with a thin thickness, such as stainless steel, and an opening 22a passing therethrough in the thickness direction is formed at the base end side. In addition, the base plate 22 is fixed to the tip of the arm portion 14 through the opening 22a. The hinge plate 23 with a sheet shape formed of a metal material, such as stainless steel, is disposed on the bottom surface of the base plate 22. The hinge plate 23 has a plate shape formed on the entire bottom surface of the base plate 22, and the distal end is formed as an extending portion 23a which extends from the tip of the base plate 22 along the longitudinal direction of the base plate 22. Two extending portions 23a extend from both ends of the hinge plate 23 in the width direction, and enlarged portions 23b whose widths expand to the inner side in the width direction, that is, in a direction facing the extending portions 23a are formed at the distal ends. The load beam 24 is connected to the upper surface of the enlarged portion 23b.

The load beam 24 is formed by a metal material with a thin thickness, such as stainless steel, similar to the base plate 22 and is connected to the hinge plate 23 with a gap between the base end and the tip of the base plate 22. Accordingly, the suspension 3 is bent between the base plate 22 and the load beam 24, and bends easily toward a Z direction perpendicular to the disk surface D1.

A flexure 25 is provided on the suspension 3. The flexure 25 has a sheet shape formed of a metal material, such as stainless steel, and is formed so as to be flexibly deformable in the thickness direction due to being formed in the sheet shape. The flexure 25 is formed by the gimbal 17, which is fixed to the distal side of the load beam 24 and has an appearance formed in an approximately pentagon shape when viewed from above, and a support 18, which is formed to have a narrower width than the gimbal 17 and extends from the base end of the gimbal 17 along the top of the suspension 3.

As shown in FIGS. 3 and 4, from the vicinity of the middle to the tip, the gimbal 17 is formed so as to be slightly warped in the thickness direction toward the disk surface D1. In addition, the gimbal 17 is fixed to the load beam 24 from the base end side to the approximate middle so that the warped distal side is not in contact with the load beam 24.

In addition, a notched portion 26 with the periphery bored in a U shape is formed at the distal side of the gimbal 17 in the floating state, and a pad portion (tongue piece portion) 17b supported like a cantilever by a connecting portion 17a is formed in a portion surrounded by the notched portion 26. That is, the pad portion 17b is formed to overhang from the distal side of the gimbal 17 toward the base end side by the connecting portion 17a and has the notched portion 26 therearound. Accordingly, since the pad portion 17b is easily bent in the thickness direction of the gimbal 17, only the pad portion 17b is angle-adjusted so as to be parallel to the bottom surface of the suspension 3. In addition, the slider 2 is placed and fixed on the pad portion 17b. That is, the slider 2 is in a state hanging on the load beam 24 with the pad portion 17b interposed therebetween.

In addition, a protruding portion 19 which protrudes toward the approximate middle of the pad portion 17b and the slider 2 is formed at the tip of the load beam 24. The tip of the protruding portion 19 is rounded. In addition, the protruding portion 19 is in point contact with the surface (upper surface) of the pad portion 17b when the slider 2 floats to the load beam 24 sides by air pressure received from the disk D. This floating force is transmitted from the protruding portion 19 to the load beam 24 and acts to bend the load beam 24. In addition, when air pressure in the XY direction is applied to the slider 2 by waviness of the disk D or the like, the slider 2 and the pad portion 17b are twisted around two axes of X and Y axes with the protruding portion 19 as the center. Accordingly, since displacement in the Z direction (displacement in a direction approximately perpendicular to the disk surface D1) caused by the undulation of the disk D can be absorbed, the posture of the slider 2 is stabilized. In addition, the protruding portion 19 and the gimbal 17 having the pad portion 17b form the gimbal means 16.

The support 18 shown in FIG. 2 has a sheet shape integrally formed in the gimbal 17 and is provided to extend toward the arm portion 14 on the suspension 3. That is, the support 18 is formed to follow deformation of the suspension 3 when the suspension 3 deforms. The support 18 turns to the side surface from the top of the arm portion 14 to be routed until it reaches the base portion 15 of the arm portion 14.

Figure 5:
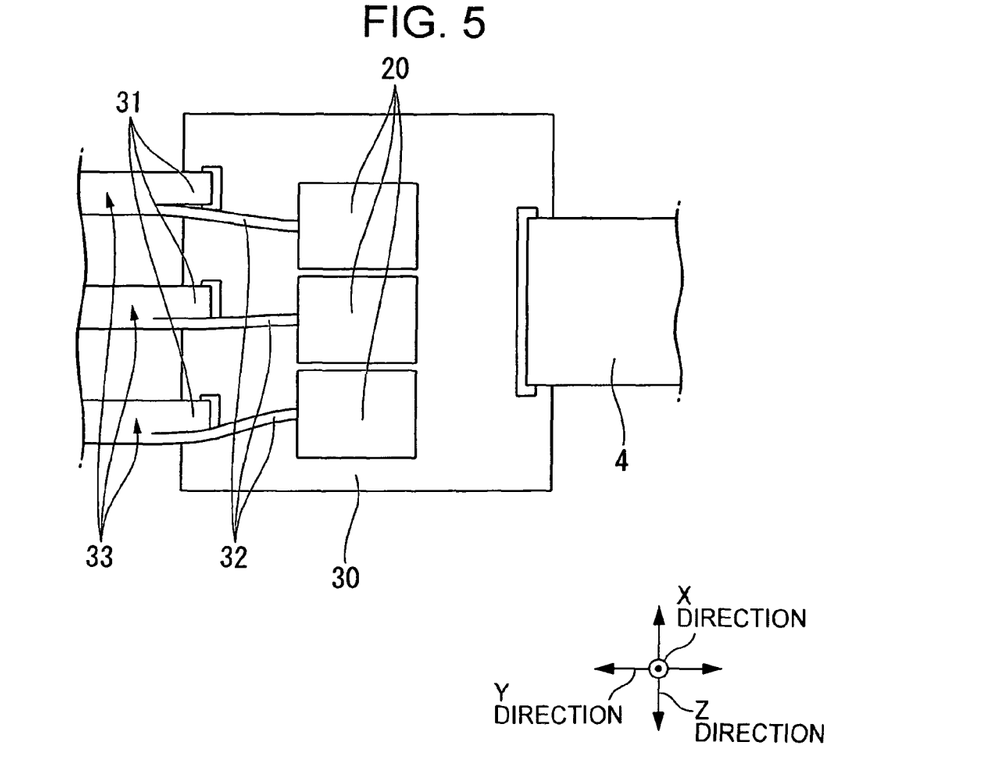
FIG. 5 is a plan view of a terminal substrate shown in FIG. 1.

FIG. 5 is a plan view of a terminal substrate 30 fixed to the base portion 15 of the carriage 11.

As shown in FIGS. 1 and 5, the terminal substrate 30 is disposed on a side surface 15c in the base portion 15 of the carriage 11. The terminal substrate 30 serves as a relay point when electrically connecting the control unit 5 and the slider 2 provided in the housing 9, and various control circuits (not shown) are formed on the surface. While the control unit 5 and the terminal substrate 30 are electrically connected by a flexible flat cable 4, the terminal substrate 30 and the slider 2 are connected by an electric wiring line 31. Three sets of electric wiring lines 31 are provided corresponding to the number of sliders 2 provided for each carriage 11, such that a signal output from the control unit 5 through the flat cable 4 is output to the slider 2 through the electric wiring lines 31.

In addition, the laser light source 20 which supplies light beam toward the condensing lens of the slider 2 is disposed on the terminal substrate 30. The laser light source 20 receives a signal output from the control unit 5 through the flat cable 4 and emits light beam on the basis of the signal. Three laser light sources 20 are disposed along the height direction (Z direction) of the base portion 15 corresponding to the number of sliders 2 provided in each arm portion 14. An optical waveguide 32 which guides a light beam emitted from each laser light source 20 to the condensing lens of the slider 2 is connected to the emission side of each laser light source 20.

Figure 6:
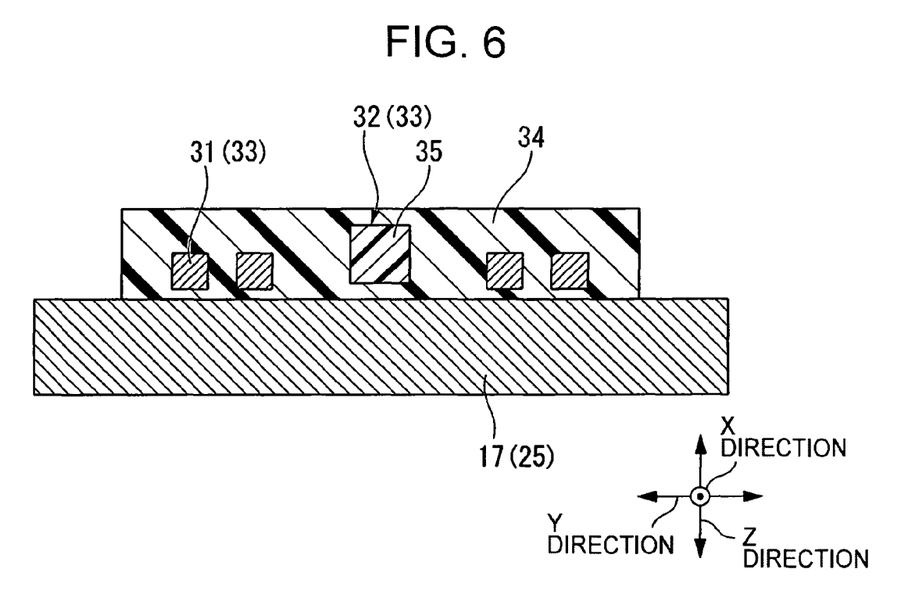
FIG. 6 is a cross-sectional view taken along the line A-A' of FIG. 3.
Figure 7:
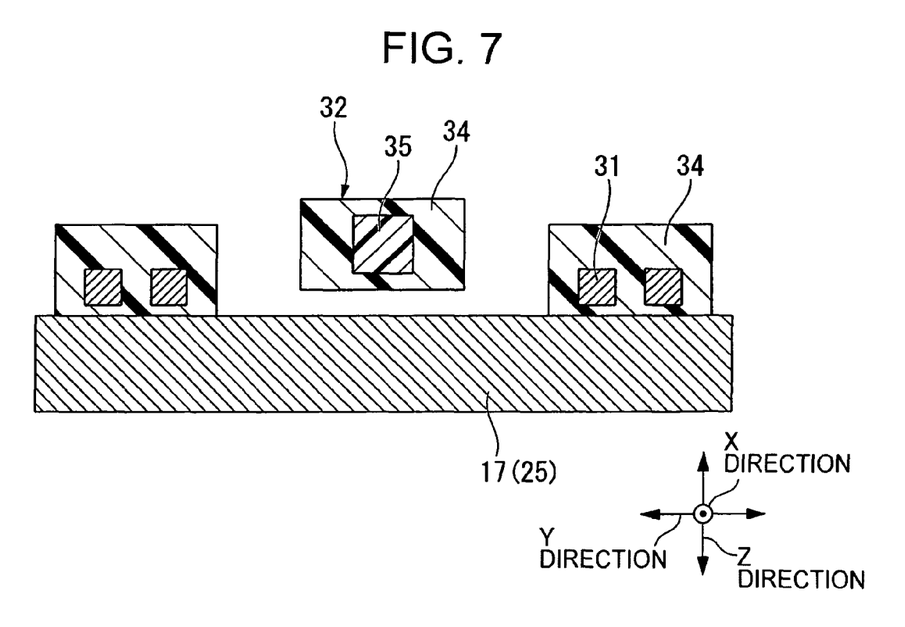
FIG. 7 is a cross-sectional view taken along the line B-B' of FIG. 3.

FIG. 6 is a cross-sectional view taken along the line A-A' of FIG. 3, and FIG. 7 is a cross-sectional view taken along the line B-B' of FIG. 3.

As shown in FIGS. 3 and 5 to 7, between the laser light source 20 and the slider 2, one optical waveguide 32 and one set of electric wiring lines 31 corresponding to each slider 2 are formed as the photoelectric composite wiring line 33 which is integrally formed from the base end side to the distal end. The photoelectric composite wiring line 33 is routed from the surface of the terminal substrate 30 onto the arm portion 14 while passing the side surface of the arm portion 14. Specifically, the photoelectric composite wiring line 33 is disposed on the above-described support 18 (refer to FIG. 2) of the flexure 25 on the arm portion 14 and the suspension 3, and is routed to the tip of the suspension 3 with the support interposed therebetween. Thus, the photoelectric composite wiring line 33 is disposed on the support 18 which is flexibly deformable. Accordingly, when the posture of the slider 2 changes or the suspension 3 deforms, the photoelectric composite wiring line 33 also deforms to follow it so that it can follow the posture change of the support 18. Accordingly, disconnection of the photoelectric composite wiring line 33 and the like can be prevented.

The optical waveguide 32 which forms the photoelectric composite wiring line 33 has a core 35, which is formed in a thickness of 3 to 10 µm, for example, and which guides light beam emitted from the laser light source 20 in a total reflection condition, and a cladding 34, which is formed in a thickness of tens of micrometers, for example, which is formed of a material with a refractive index lower than the refractive index of the core 35, and which adheres to the core 35 to seal the core 35. In addition, light beam emitted from the laser light source 20 are guided to the condensing lens of the slider 2 in the total reflection condition due to the difference between the refractive indices of the core 35 and the cladding 34.

In addition, if an example of the combination of materials used as the cladding 34 and the core 35 is described, a combination may be considered in which the core 35 is formed in a thickness of 3 to 10 µm, for example, by PMMA (polymethyl methacrylate) and the cladding 34 is formed in a thickness of tens of micrometers by a fluorine-containing polymer. In addition, both the core 35 and the cladding 34 may be formed of epoxy resin (for example, the refractive index of the core is 1.522 to 1.523, and the refractive index of the cladding is 1.518 to 1.519) or may be formed of fluorinated polyimide. In addition, since the force which traps light beam in the core 35 increases as the difference between the refractive indices of the core 35 and the cladding 34 increases, it is preferable to increase the difference between the refractive indices by adjusting the mixing of resin materials which form the core 35 and the cladding 34. For example, in the case of fluorinated polyimide, the refractive indices can be controlled by adjusting the fluorine content or by energy irradiation of emitted light or the like.

In addition, the electric wiring line 31 is formed of aluminum, copper, or the like and is confined in the cladding 34 together with the core 35.

As shown in FIGS. 6 and 7, in the photoelectric composite wiring line 33, the core 35 of the optical waveguide 32 is disposed in the middle of the cladding 34 in the width direction (YZ plane) in sectional view, and two electric wiring lines 31 are disposed at each of both sides of the optical waveguide 32 so as to interpose the optical waveguide 32 therebetween. That is, the photoelectric composite wiring line 33 is formed so as to be symmetric with respect to the core 35. Thus, since both the core 35 and the electric wiring line 31 are sealed with the cladding 34, they are formed as the photoelectric composite wiring line 33 in which the optical waveguide 32 and the electric wiring line 31 are integrally formed.

Here, as shown in FIG. 3, the photoelectric composite wiring line 33 branches off to the electric wiring line 31 and the optical waveguide 32 at the tip of the suspension 3, specifically, at the middle position of the gimbal 17. The radius of curvature of the optical waveguide 32 from this branch point C to the slider 2 is larger than the radius of curvature of the electric wiring line 31.

Specifically, the optical waveguide 32 extends along the longitudinal direction of the gimbal 17 from the branch point C at the distal side of the photoelectric composite wiring line 33 and is directly connected to the base end side of the slider 2 across the notched portion 26 of the gimbal 17. The optical waveguide 32 is separated from the bottom surface of the gimbal 17 at the branch point C of the photoelectric composite wiring line 33, and extends in a slightly floating state from the branch point C toward the base end side of the slider 2 so as to be stretched over between the pad portion 17b and the gimbal 17. That is, on the bottom surface of the gimbal 17, the optical waveguide 32 is routed to the base end surface side of the slider 2 in a state extending approximately linearly (radius of curvature is approximately infinite). The optical waveguide 32 routed to the base end surface side of the slider 2 is connected to the near-field light generating element, which is provided at the distal surface side of the slider 2, through the condensing lens in the slider 2.

On the other hand, at the branch point C, the electric wiring line 31 is bent toward a peripheral portion of the gimbal 17 and is routed from the peripheral portion of the gimbal 17, that is, from the outside of the notched portion 26. In addition, the electric wiring line 31 routed from the outside of the notched portion 26 is connected to the distal surface side of the slider 2 through the connecting portion 17a. That is, the electric wiring line 31 is directly connected, from the outside of the slider 2, to the reproduction element or the recording element provided at the distal surface side of the slider 2.

Meanwhile, since the pad portion 17b is formed to overhang from the distal side of the gimbal 17 toward the base end side as described above, bending of the optical waveguide 32 becomes large if the optical waveguide 32 is routed to the slider 2 so as to be turned from the distal side of the gimbal 17 along the gimbal 17, that is, from the outside of the notched portion 26.

On the other hand, in the present embodiment, the optical waveguide 32 is routed from the base end side of the gimbal 17 to the slider 2 across the notched portion 26. Accordingly, the optical waveguide 32 can be directly connected to the slider 2 provided on the pad portion 17b. In this case, since routing of the shortest distance from the branch point C of the photoelectric composite wiring line 33 to the slider 2 becomes possible, the optical waveguide 32 can be routed to the slider 2 without bending as much as possible. On the other hand, since there is no problem even if the electric wiring line 31 is bent, the electric wiring line 31 can be directly connected to a recording element and a reproduction element of the slider 2 by routing the electric wiring line 31 from the outside of the notched portion 26 to the slider 2.

In addition, by using the resin material described above as a constituent material of the optical waveguide 32 of the photoelectric composite wiring line 33, the photoelectric composite wiring line 33 can be manufactured according to a semiconductor process. The photoelectric composite wiring line 33 is formed on the flexure 25, and the flexure 25 is fixed to the suspension 3 and the carriage 11.

A method of manufacturing the photoelectric composite wiring line 33 of the present embodiment using a semiconductor process will be described more specifically. First, a sacrificial layer formed of a resin material or the like is applied in the arrangement region of the slider 2 and the forming region of the notched portion 26. Then, a constituent material of the cladding 34 is applied on a plate, which becomes the flexure 25, so as to cover the sacrificial layer and is then patterned by a photolithography technique or the like. Then, a constituent material of the electric wiring line 31 is formed as a film on the cladding 34 by a sputtering method, a CVD method, or the like and is patterned as the plurality of electric wiring lines 31. Then, a constituent material of the core 35 is applied between the electric wiring lines 31, that is, in the middle of the cladding 34 on the YZ plane and is then patterned, and a constituent material of the cladding 34 is applied again. Then, the photoelectric composite wiring line 33 of the present embodiment can be formed by patterning.

Then, the sacrificial layer formed in the arrangement region of the slider 2 and the forming region of the notched portion 26 is removed by etching or the like and is then punched in the shape of the flexure 25 by pressing or the like. At this time, by punching the forming region of the notched portion 26 together, the optical waveguide 32 floats between the notched portion 26 and the pad portion 17b. Thereafter, the flexure 25 formed with the photoelectric composite wiring line 33 is fixed to the suspension 3 and the carriage 11.

Thus, by integrally forming the optical waveguide 32 and the electric wiring line 31 by the cladding 34 formed of a resin material, these can be collectively formed according to the semiconductor process. Moreover, since the photoelectric composite wiring line 33 is manufactured using the semiconductor process, manufacturing efficiency can be improved through the easiness of mass production, compared with the case where the optical waveguide 32 and the electric wiring line 31 are separately formed. Accordingly, the processing accuracy can be improved. In addition, manufacturing costs can be reduced.

Next, procedures of recording and reproducing various kinds of information on and from the disk D using the information recording and reproduction apparatus 1 configured as described above will be described below.

First, the spindle motor 7 is driven to rotate the disk D in a predetermined direction. Then, the actuator 6 is operated to rotate the carriage 11 around the pivot shaft 10 as the center of rotation, so that the head gimbal assembly 12 performs scanning in the XY direction through the carriage 11. Thus, the slider 2 can be located at the desired position on the disk D.

Here, since the base portion 15 of the carriage 11 is configured so as to be rotatable around the pivot shaft 10, the arm portion 14 moves in a direction parallel to the disk surface D1 with the pivot shaft 10 as the center of rotation. At this time, since the laser light source 20 is provided on the terminal substrate 30 of the base portion 15, the moment acting on the carriage 11 at the time of movement of the slider 2 is small compared with the case where the laser light source 20 is mounted in the slider 2. Accordingly, the tracking accuracy can be maintained. In addition, since the terminal substrate 30 serves as a relay point when electrically connecting the control unit 5 and the slider 2 to each other, the electric wiring line 31 is routed to the slider 2 with the terminal substrate 30 as a base point. That is, since base ends of the optical waveguide 32 and the electric wiring line 31 are brought close to each other by disposing the laser light source 20 on the terminal substrate 30, the photoelectric composite wiring line 33 can be easily formed.

Subsequently, light beams from the laser light source 20 are incident on the optical waveguide 32 (photoelectric composite wiring line 33) and are then guided to the slider 2. In the information recording and reproduction apparatus 1 of the present embodiment, the laser light source 20 which supplies light beams to the condensing lens of the slider 2 is provided on the terminal substrate 30 in the base portion 15 of the slider 2. In this case, light beams emitted from the laser light source 20 are introduced into the core 35 from one end side of the core 35 in the photoelectric composite wiring line 33 and propagate toward the slider 2 while repeating total reflection on the interface between the core 35 and the cladding 34. At this time, the light beams having propagated through the core 35 are condensed by the condensing lens within the slider 2, and the spot size narrows gradually. Accordingly, near-field light is generated around the near-field light generating element so as to leak out. In addition, since the core 35 is sealed in a state where the cladding 34 adheres thereto, a propagating light beam does not leak to the outside of the core 35 on the way. Consequently, the introduced light beam can be efficiently used as near-field light without light being lost.

In addition, the disk D on which near-field light has been incident is locally heated by the near-field light and the coercivity is temporarily reduced. On the other hand, if a current is supplied to the recording element of the slider 2 by the control unit 5, a recording magnetic field in a direction perpendicular to the disk D can be generated by the principle of an electromagnet. As a result, the information can be recorded by the hybrid magnetic recording method in which near-field light and the recording magnetic field generated in the recording element are made to cooperate with each other.

On the other hand, when reproducing the information recorded on the disk D, the reproduction element which is fixed adjacent to the recording element receives a magnetic field leaking from the disk D and the electric resistance changes according to its size. Accordingly, the voltage of the reproduction element changes. Then, the control unit 5 can detect the change in the magnetic field leaking from the disk D as a voltage change. In addition, the control unit 5 can reproduce the information by reproducing a signal from the voltage change.

Thus, various kinds of information can be recorded and reproduced on and from the disk D using the slider 2.

Here, the slider 2 is supported by the suspension 3 and is also pressed toward the disk D by the predetermined force. Moreover, at the same time, since the floating surface 2a faces the disk D, the slider 2 receives a floating force by an influence of air pressure caused by the rotating disk D. By the balance of both the forces, the slider 2 floats to the position spaced apart from the disk D.

In this case, since the slider 2 is pressed toward the suspension 3 by the air pressure, the pad portion 17b of the gimbal 17 which fixes the slider 2 and the protruding portion 19 formed in the suspension 3 are in point contact with each other. In addition, the floating force is transmitted to the suspension 3 through the protruding portion 19, and it acts to bend the suspension 3 in a Z direction perpendicular to the disk surface D1. As a result, the slider 2 floats as described above. In addition, since the base plate 22 and the load beam 24 are connected to the suspension 3 through the hinge plate 23, it can be easily bent between the base plate 22 and the load beam 24.

Moreover, even if the slider 2 receives air pressure (air pressure in the XY direction) caused by the undulation of the disk D, it is twisted around the X and Y axes through the gimbal means 16, that is, through the pad portion 17b which is in point contact with the tip of the protruding portion 19. Accordingly, since displacement in the Z direction caused by the undulation can be absorbed, the posture of the slider 2 when it floats can be stabilized.

Thus, the information recording and reproduction apparatus 1 of the present embodiment is configured such that the optical waveguide 32 and the electric wiring line 31 are integrally formed as the photoelectric composite wiring line 33.

According to this configuration, since the optical waveguide 32 and the electric wiring line 31 are integrally formed as the photoelectric composite wiring line 33, the optical waveguide 32 and the electric wiring line 31 can be simultaneously fixed. Accordingly, a lowering in manufacturing efficiency can be prevented. That is, even when the laser light source 20 is disposed at a position distant from the slider 2, the photoelectric composite wiring line 33 can be easily routed to the slider 2.

In addition, since the optical waveguide 32 and the electric wiring line 31 are integrally formed, it is not necessary to take into consideration the layout in the routing of wiring lines unlike the related art, and the degree of freedom in fixing the photoelectric composite wiring line 33 can be improved. Therefore, since the layout efficiency of the photoelectric composite wiring line 33 can be improved, the photoelectric composite wiring line 33 can be easily routed to the slider 2 even when the laser light source 20 is disposed at a position distant from the slider 2, as described above, on the terminal substrate 30.

In this case, a possibility that the heat generated from the laser light source 20 when a light beam is supplied will be transmitted up to the slider 2 is very small. Accordingly, an influence of the heat generated from the laser light source 20 can be suppressed.

Meanwhile, when the laser light source 20 is disposed in the control unit 5, an optical waveguide is provided in the flat cable 4. If the flat cable 4 is bent to deform, there is a problem that the guiding loss of light is increased. In the present embodiment, it is not necessary to provide an optical waveguide in the flat cable 4 because the laser light source 20 is provided in the base portion 15 of the carriage 11. Accordingly, the guiding loss of light can be suppressed.

Moreover, in the present embodiment, since the layout efficiency of the photoelectric composite wiring line 33 can be improved as described above, bending of the photoelectric composite wiring line 33 is small. As a result, since the guiding loss of light beam passing through the optical waveguide 32 of the photoelectric composite wiring line 33 can be reduced, the light propagation efficiency can be maintained.

In particular, the information recording and reproduction apparatus 1 of the present embodiment is configured such that the distal side of the photoelectric composite wiring line 33 branches off to the optical waveguide 32 and the electric wiring line 31 and is routed to the slider 2.

According to this configuration, by branching off the photoelectric composite wiring line 33 again at the distal side, the optical waveguide 32 and the electric wiring line 31 can be routed to the slider 2 along different paths. As a result, the routing path to the slider 2 is not restricted. That is, since the degree of freedom in routing of the optical waveguide 32 and the electric wiring line 31 can be improved compared with the configuration in which the optical waveguide 32 and the electric wiring line 31 are routed to the slider 2 in a state where they are integrally formed, a routing path which is optimal for each wiring line (the optical waveguide 32 and the electric wiring line 31) can be selected. In this case, the optical waveguide 32 can be routed to the slider 2 without bending as much as possible by setting the radius of curvature of the optical waveguide 32 to be larger than the radius of curvature of the electric wiring line 31. Accordingly, since the guiding loss of light beam passing through the optical waveguide 32 can be reduced, the light propagation efficiency can be maintained.

Therefore, in order to prevent a lowering in the manufacturing efficiency, the laser light source 20 can be disposed so as to be spaced apart from the slider 2. As a result, an influence of heat generated from the laser light source 20 can be suppressed and the light propagation efficiency can be improved. In addition, it is possible to prevent the deformation of the slider 2 caused by the influences of thermal expansion, warpage, and the like of the slider 2. In addition, the characteristic of the reproduction element of the slider 2 can be maintained.

Here, since the core 35 and the electric wiring line 31 are sealed with the same cladding 34, a distance between the core 35 and the electric wiring line 31 or a distance between the electric wiring lines 31 can be reduced compared with the case where the optical waveguide 32 and the electric wiring lines 31 are separately formed. In addition, since it is not necessary to cover an insulating material or the like for each electric wiring line 31, the photoelectric composite wiring line 33 can be made small and light. In addition, since the insulation between the electric wiring lines 31 can be ensured by the cladding 34, routing of each electric wiring line 31 becomes easy.

In addition, by disposing the core 35 in the approximately middle on the cross section of the cladding 34 and disposing the electric wiring lines 31 so as to be symmetric with respect to the core 35, the plurality of electric wiring lines 31 is distributed at both sides of the core 35. Then, since the routing space of the electric wiring lines 31 can be ensured, the layout efficiency between the electric wiring lines 31 can be improved compared with the case where the electric wiring lines 31 are placed at only one side of the core 35. Accordingly, connection of the core 35 and the electric wiring line 31 to the slider 2 becomes easy, and the force acting on the slider 2 from the photoelectric composite wiring line 33 becomes uniform.

In addition, the force acting on the slider 2 from the optical waveguide 32 and the electric wiring line 31 does not concentrate by routing the optical waveguide 32 and the electric wiring line 31 to the slider 2 so as to be branched.

Therefore, since obstruction of the photoelectric composite wiring line 33 (the optical waveguide 32 and the electric wiring line 31) in posture control of the slider 2 can be prevented, there is little influence on the floating characteristic of the slider 2, tracking accuracy, and the like.

(Second Embodiment)

Next, a second embodiment of the present invention will be described. In the present embodiment, a routing path of the optical waveguide 32 from the branch point of a photoelectric composite wiring line to a slider is different from that in the first embodiment described above. Moreover, in the following explanation, the same configurations as in the first embodiment described above are denoted by the same reference numerals and the explanation will be omitted.

Figure 8:
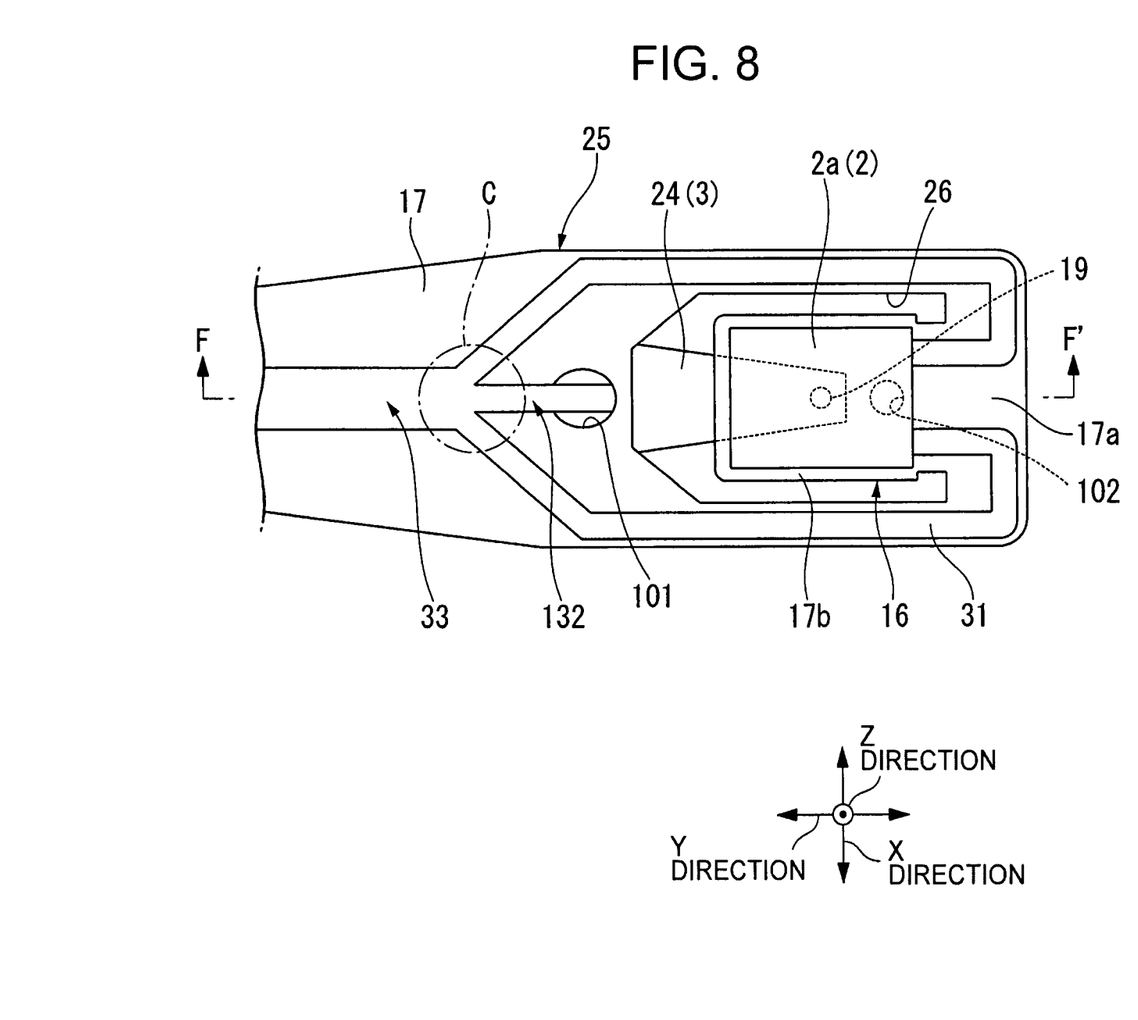
FIG. 8 is a plan view of a gimbal in a second embodiment.
Figure 9:
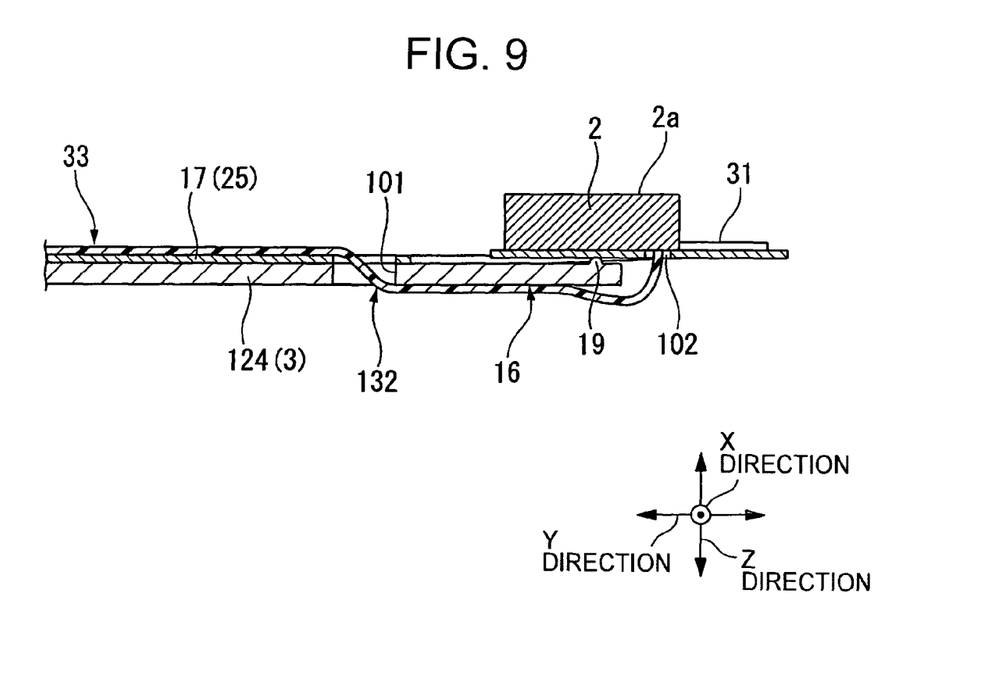
FIG. 9 is a cross-sectional view taken along the line F-F' of FIG. 8.

FIG. 8 is a plan view of a gimbal in the second embodiment, and FIG. 9 is a cross-sectional view taken along the line F-F' of FIG. 8.

As shown in FIG. 8, a through hole 101 passing through a gimbal 17 and a load beam 24 in the thickness direction is formed in the gimbal 17 and the load beam 24. The through hole 101 is formed at the distal side of the gimbal 17 from the branch point C of the photoelectric composite wiring line 33 and is formed in a state where the gimbal 17 and the load beam 24 overlap each other. Moreover, in a root portion of a connecting portion 17a and a pad portion 17b in the gimbal 17, a through hole 102 passing therethrough in the thickness direction of the gimbal 17 is formed.

Here, an optical waveguide 132 branching off from the branch point C of the photoelectric composite wiring line 33 is routed to the opposite side of the slider 2 so as to be interposed between the gimbal 17 and the load beam 24 through the through hole 101. In addition, the optical waveguide 132 passing through the through hole 101 extends along the longitudinal direction of the load beam 124 to be inserted into the through hole 102. The optical waveguide 132 inserted into the through hole 102 is directly connected to the slider 2 from the opposite side to the floating surface 2a of the slider 2. That is, the optical waveguide 132 branching off from the branch point C of the photoelectric composite wiring line 33 passes through the through holes 101 and 102 and is connected to the slider 2 so as to be turned from the opposite surface to the floating surface 2a of the slider 2.

Thus, according to the present embodiment, the optical waveguide 132 can be directly routed to the distal side of the slider 2 by making the optical waveguide 132 passing through the through holes 101 and 102. Therefore, the same effects as in the first embodiment described above can be achieved.

In addition, the technical scope of the present invention is not limited to the embodiment described above, but those obtained by modifying the above-described embodiment in various ways without departing from the spirit and scope of the present invention are also included. That is, the configuration and the like mentioned in the above embodiment are no more than examples and may be appropriately changed.

Figure 10:
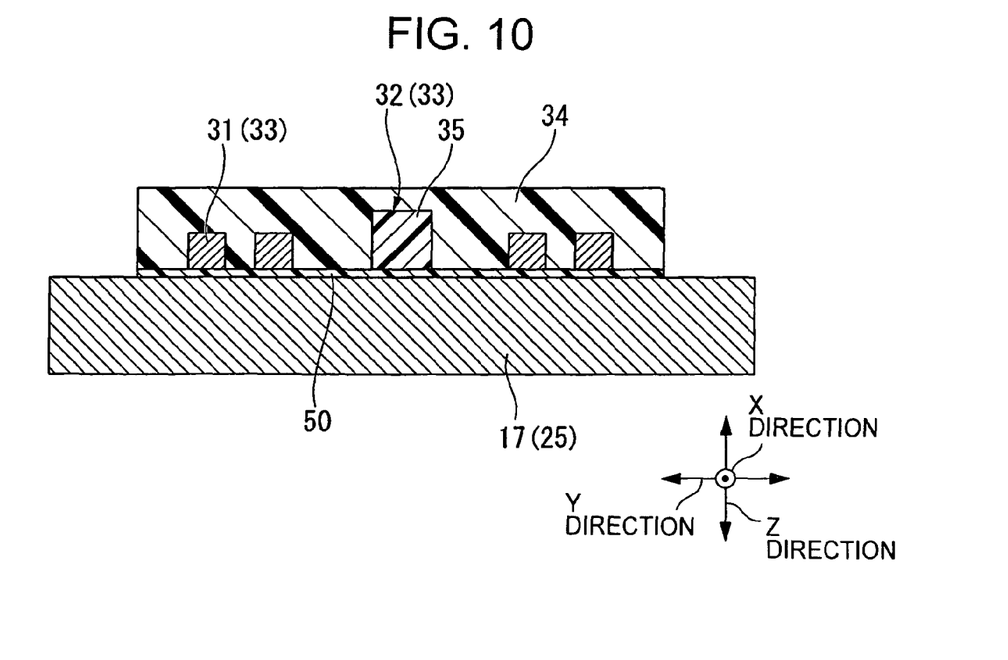
FIG. 10 is a cross-sectional view equivalent to the line A-A' of FIG. 3 which shows another embodiment of the information recording and reproduction apparatus related to the present invention.

For example, as shown in FIG. 10, a configuration is also possible in which a base film 50 is provided between the photoelectric composite wiring line 33 and the flexure 25. The base film 50 is formed of an insulating material, such as polyimide. In this case, insulation between the electric wiring line 31 and the flexure 25 can be more reliably ensured.

Figure 11:
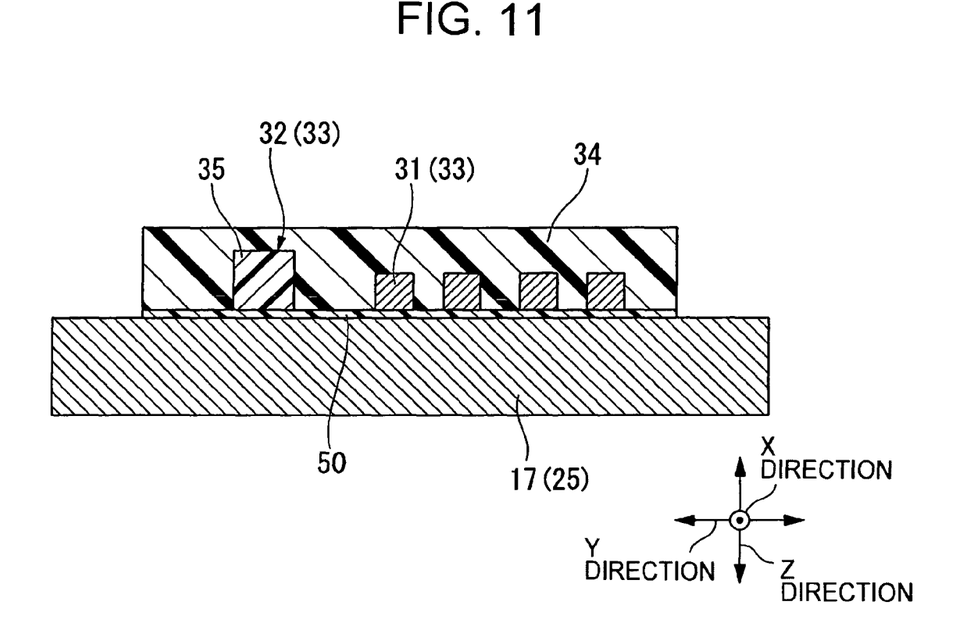
FIG. 11 is a cross-sectional view equivalent to the line A-A' of FIG. 3 which shows still another embodiment of the information recording and reproduction apparatus related to the present invention.

Moreover, in the above embodiment, the case was described in which the electric wiring line 31 was disposed so as to be symmetric with respect to the optical waveguide 32, as shown in FIG. 11. However, layout design of the electric wiring line 31 and the optical waveguide 32 may be appropriately changed. For example, as shown in FIG. 9, the optical waveguide 32 and the electric wiring line 31 may be disposed so as to be located in a line in order from one end side of the cladding 34 in the width direction (YZ plane).

Moreover, in the above embodiment, the configuration was described in which the optical waveguide 32 and the electric wiring line 31 were sealed with the cladding 34 of the same material, as shown in FIG. 6. However, the core 35 and the electric wiring line 31 may be sealed with different constituent materials as long as the optical waveguide 32 and the electric wiring line 31 are integrally formed. According to this configuration, since the core 35 and the electric wiring line 31 can be sealed with different constituent materials, constituent materials which are optimal for the conditions for sealing the core 35 and the electric wiring line 31 can be freely selected.

In addition, although the configuration in which two electric wiring lines 31 branched off from the branch point C of the photoelectric composite wiring line 33 was described in the above embodiments, one or three or more electric wiring lines 31 may also be branched without being limited thereto.

Moreover, although the air floating type information recording and reproduction apparatus in which a slider was floated was described as an example in each of the embodiments described above, a disk and a slider may be in contact with each other as long as it is disposed so as to face the disk surface without being limited to the case. That is, the slider of the present invention may be a contact slider type slider. Also in this case, the same operations and effects can be achieved.

In addition, although the configuration in which a head gimbal assembly was provided at only one surface side of an arm portion was described in the above embodiments, a configuration is also possible in which head gimbal assemblies are provided on both surfaces of an arm portion inserted between disks so as to face each disk. In this case, the information on the disk surface facing each slider can be recorded and reproduced by each slider of the head gimbal assembly provided at both surface sides of the arm portion. That is, since the information of two disks can be recorded and reproduced by one arm portion, it is possible to increase the recording capacity of an information recording and reproduction apparatus and to reduce the size of the apparatus.

Reference Signs List

C: branch point
D: disk (magnetic recording medium)
D1: disk surface (surface of magnetic recording medium)
1: information recording and reproduction apparatus
2: slider
5: control unit
10: pivot shaft 11: carriage
16: gimbal means
17b: pad portion (tongue piece portion)
20: laser light source (light source)
26: notched portion
31: electric wiring line
32, 132: optical waveguide
33: photoelectric composite wiring line

The invention claimed is:

1. An information recording and reproduction apparatus comprising:
a magnetic recording medium mounted to undergo rotation in a predetermined direction;
a light source that emits a light beam to heat the magnetic recording medium;
a carriage mounted to undergo rotation about a pivot shaft;
a slider supported at a distal side of the carriage so as to face a surface of the magnetic recording medium, the slider having an optical system that condenses the light beam emitted from the light source and a near-field light generating element that generates near-field light from the condensed light beam;
a control unit that controls an operation of the slider; and
a photoelectric composite wiring line in which an optical waveguide, which introduces the light beam emitted from the light source into the slider, and a plurality of electric wiring lines, which electrically connect the slider and the control unit to each other, are integrally formed, the optical waveguide and all of the electric wiring lines branching off at a distal side of the photoelectric composite wiring line so as to be routed to the slider;
wherein information is recorded on the magnetic recording medium by heating the magnetic recording medium with the near-field light generated by the near-field light generating element and causing magnetization reversal by applying a recording magnetic field to the magnetic recording medium.

2. An information recording and reproduction apparatus according to claim 1; wherein a radius of curvature of the optical waveguide from the distal side of the photoelectric composite wiring line to the slider is larger than a radius of curvature of each electric wiring line.

3. An information recording and reproduction apparatus according to claim 2; further comprising gimbal means arranged in the carriage for supporting the slider such that the slider can pivot about two axes that are perpendicular to each other and parallel to the surface of the magnetic recording medium, and a tongue piece portion provided in the gimbal means and arranged so as to overhang from the distal side of the carriage toward a base end side of the carriage, the tongue piece portion having a notched portion in a periphery thereof; wherein the slider is provided on the tongue piece portion and has a recording element and a reproduction element at the distal side of the carriage; wherein the electric wiring lines are routed to the slider from the distal side and along the surface of the carriage; and wherein the optical waveguide is routed from the base end side of the carriage to the slider across the notched portion of the tongue piece portion.

4. An information recording and reproduction apparatus according to claim 1; further comprising gimbal means arranged in the carriage for supporting the slider such that the slider can pivot about two axes that are perpendicular to each other and parallel to the surface of the magnetic recording medium, and a tongue piece portion provided in the gimbal means and arranged so as to overhang from the distal side of the carriage toward a base end side of the carriage, the tongue piece portion having a notched portion in a periphery thereof; wherein the slider is provided on the tongue piece portion and has a recording element and a reproduction element at the distal side of the carriage; wherein the electric wiring lines are routed to the slider from the distal side and along the surface of the carriage; and wherein the optical waveguide is routed from the base end side of the carriage to the slider across the notched portion of the tongue piece portion.

5. An information recording and reproduction apparatus according to claim 1; further comprising supporting means for supporting the slider such that the slider can pivot about two axes that are perpendicular to each other and parallel to the surface of the magnetic recording medium.

6. An information recording and reproduction apparatus according to claim 1; further comprising a suspension mounted at the distal end side of the carriage for undergoing movement in a plane parallel to the surface of the magnetic recording medium, and supporting means for fixedly mounting the slider to a surface of the suspension such that the slider can pivot about two axes that are perpendicular to each other and parallel to the surface of the magnetic recording medium.

7. An information recording and reproduction apparatus according to claim 6; wherein the supporting means for fixedly mounting the slider to a surface of the suspension comprises a pad portion disposed between the suspension and the slider.

8. An information recording and reproduction apparatus according to claim 7; wherein the suspension has a protruding portion configured to be disposed in point contact with an approximate center of the pad portion during pivotal movement of the slider about the two axes parallel to the surface of the magnetic recording medium.

9. An information recording and reproduction apparatus according to claim 1; further comprising a tongue piece portion arranged so as to overhang from the distal side of the carriage toward a base end side of the carriage, the tongue piece having a notched portion in a periphery thereof; wherein the slider is provided on the tongue piece portion and has a recording element and a reproduction element at the distal side of the carriage; wherein the electric wiring lines are routed to the slider from the distal side and along the surface of the carriage; and
wherein the optical waveguide is routed from the base end side of the carriage to the slider across the notched portion of the tongue piece portion.

10. An information recording and reproduction apparatus comprising:
a magnetic recording medium on which information is recorded and from which the recorded information is reproduced;
a light source configured to output a light beam to heat the magnetic recording medium;
a near-field light head having a recording element for recording information on the magnetic recording medium and a reproducing element for reproducing information from the magnetic recording medium, the near-field light head being supported so as to confront a surface of the magnetic recording medium and for undergoing pivotal movement about two axes that are perpendicular to each other and parallel to a surface of the magnetic recording medium, the near-field light head having a near-field light generating element for generating near-field light;
an optical waveguide connected to the near-field light head for introducing a light beam from the light source into the near-field light head from which the near-field light generating element generates near-field light;

a control section configured to supply a current to the recording element of the near-field light head for generating a recording magnetic field in a direction perpendicular to the surface of the magnetic recording medium; and a photoelectric composite wiring line having the optical waveguide and electric wiring lines integral with the optical waveguide and electrically connecting the near-field light head to the control section, the optical waveguide and all of the electric wiring lines branching off from a distal side of the photoelectric composite wiring line so as to connect to the near-field light head.

11. An information recording and reproduction apparatus according to claim 10; wherein a radius of curvature of the optical waveguide from the distal side of the photoelectric composite wiring line to the near-field light head is larger than a radius of curvature of each electric wiring line.

12. An information recording and reproduction apparatus according to claim 10; further comprising a carriage mounted to undergo rotation about a pivot shaft, the near-field light head being supported at a distal end side of the carriage.

13. An information recording and reproduction apparatus according to claim 12; further comprising supporting means arranged in the carriage for supporting the near-field light head such that the near-field light head can pivot about the two axes that are perpendicular to each other and parallel to the surface of the magnetic recording medium, and a tongue piece portion provided in the supporting means and arranged so as to overhang from the distal side of the carriage toward a base end side of the carriage, the tongue piece portion having a notched portion in a periphery thereof; wherein the near-field light head is provided on the tongue piece portion and the recording and reproduction elements thereof are provided at the distal side of the carriage; wherein the electric wiring lines are routed to the near-field light head from the distal side and along the surface of the carriage; and wherein the optical waveguide is routed from the base end side of the carriage to the near-field light head across the notched portion of the tongue piece portion.

14. An information recording and reproduction apparatus according to claim 10; further comprising supporting means for supporting the near-field light head to undergo pivotal movement about the two axes that are perpendicular to each other and parallel to the surface of the magnetic recording medium.

15. An information recording and reproduction apparatus according to claim 10; further comprising a carriage supporting the near-field light head and mounted to undergo rotation about a pivot shaft, a suspension mounted at a distal end side of the carriage for undergoing movement in a plane parallel to the surface of the magnetic recording medium, and supporting means for fixedly mounting the near-field light head to a surface of the suspension such that the near-field light head can pivot about the two axes that are perpendicular to each other and parallel to the surface of the magnetic recording medium.

16. An information recording and reproduction apparatus according to claim 15; wherein the supporting means for fixedly mounting the near-field light head to a surface of the suspension comprises a pad portion disposed between the suspension and the near-field light head.

17. An information recording and reproduction apparatus according to claim 16; wherein the suspension has a protruding portion configured to be disposed in point contact with an approximate center of the pad portion during pivotal movement of the near-field light head about the two axes parallel to the surface of the magnetic recording medium.

18. An information recording and reproduction apparatus according to claim 17; further comprising a tongue piece portion arranged so as to overhang from a distal side of the carriage toward a base end side of the carriage, the tongue piece having a notched portion in a periphery thereof; wherein the near-field light head is provided on the tongue piece portion and has the recording and reproduction elements thereof at the distal side of the carriage; wherein the electric wiring lines are routed to the near-field light head from the distal side and along the surface of the carriage; and wherein the optical waveguide is routed from the base end side of the carriage to the near-field light head across the notched portion of the tongue piece portion.

19. An information recording and reproduction apparatus according to claim 10; further comprising a carriage supporting the near-field light head and mounted to undergo rotation about a pivot shaft, and a tongue piece portion arranged so as to overhang from a distal side of the carriage toward a base end side of the carriage, the tongue piece having a notched portion in a periphery thereof; wherein the near-field light head is provided on the tongue piece portion and has the recording and reproduction elements thereof at the distal side of the carriage; wherein the electric wiring lines are routed to the near-field light head from the distal side and along the surface of the carriage; and wherein the optical waveguide is routed from the base end side of the carriage to the near-field light head across the notched portion of the tongue piece portion.

20. An information recording and reproduction apparatus according to claim 1;

wherein the optical waveguide and all of the electric wiring lines of the photoelectric composite wiring line are routed together from the light source to a branch point disposed between the light source and the slider, the photoelectric composite wiring line branching off from the branch point into the optical waveguide and all of the electric wiring lines.

21. An information recording and reproduction apparatus according to claim 10;

wherein the optical waveguide and all of the electric wiring lines of the photoelectric composite wiring line are routed together from the light source to a branch point disposed between the light source and the near-field light head, the photoelectric composite wiring line branching off from the branch point into the optical waveguide and all of the electric wiring lines.

* * * * *